United States Patent [19]
Lorentz et al.

[11] 3,965,866
[45] June 29, 1976

[54] ANIMAL EXERCISER

[76] Inventors: Merle J. Lorentz, Rte. 1, Chewelah, Wash. 99109; Donald F. Salzman, Rte. 3 - Box 167B, Colville, Wash. 99114

[22] Filed: Feb. 7, 1975

[21] Appl. No.: 548,084

[52] U.S. Cl. .......................... 119/29; 74/242.1 TA; 272/70
[51] Int. Cl.² .......................................... A01K 29/00
[58] Field of Search .............. 119/29; 272/70, 29 R, 272/39, 40, 41; 104/1 R, 89; 74/242.1 R, 242.1 A, 242.1 TA

[56] References Cited
UNITED STATES PATENTS

| | | | |
|---|---|---|---|
| 895,055 | 8/1908 | Spooner | 272/70 |
| 1,589,393 | 6/1926 | Howe | 74/242.1 R |
| 2,500,805 | 3/1950 | Costello | 119/29 |

*Primary Examiner*—Louis G. Mancene
*Assistant Examiner*—J. N. Eskovitz
*Attorney, Agent, or Firm*—Wells, St. John & Roberts

[57] ABSTRACT

An animal exercising device adapted to be mounted overhead within a support structure spanning a prescribed floor or ground area. The device includes a drive sheave and a plurality of idler sheaves that are suspended overhead to receive an endless elongated belt. The drive sheave is operated by a motor to move the belt about a continuous cycle. A tether assembly is connected to the belt and includes a drum and retractable cord adapted to be connected to an animal's leash or halter. When the device is in operation the animal is led about the circuit defined by the driving and idler sheaves. When not in use the cord automatically retracts upwardly to provide a clear open area below the device that may be utilized for other purposes.

4 Claims, 7 Drawing Figures

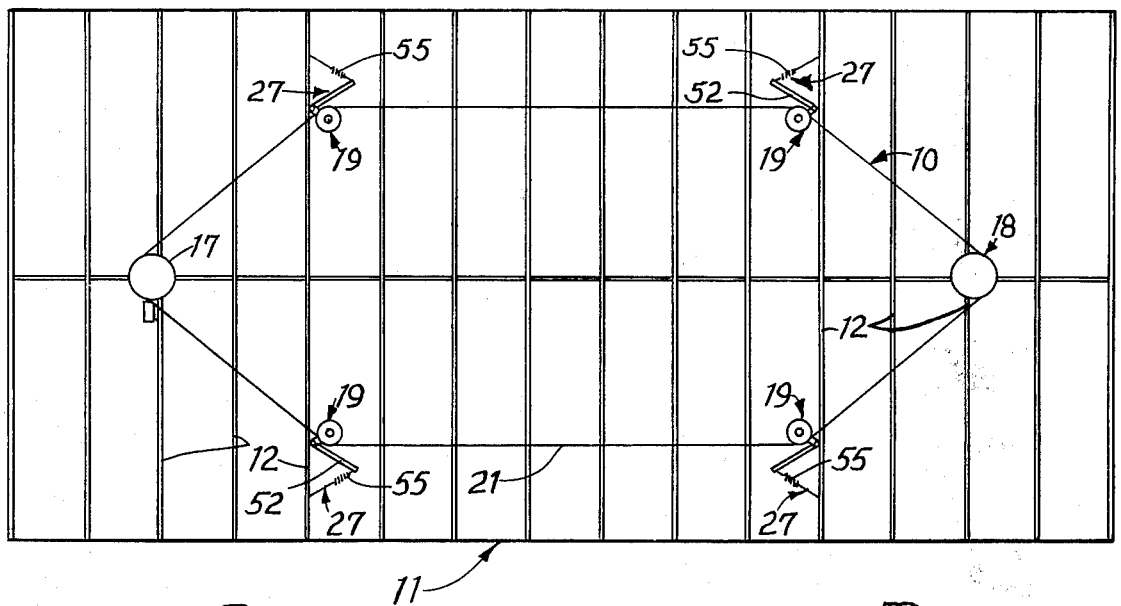
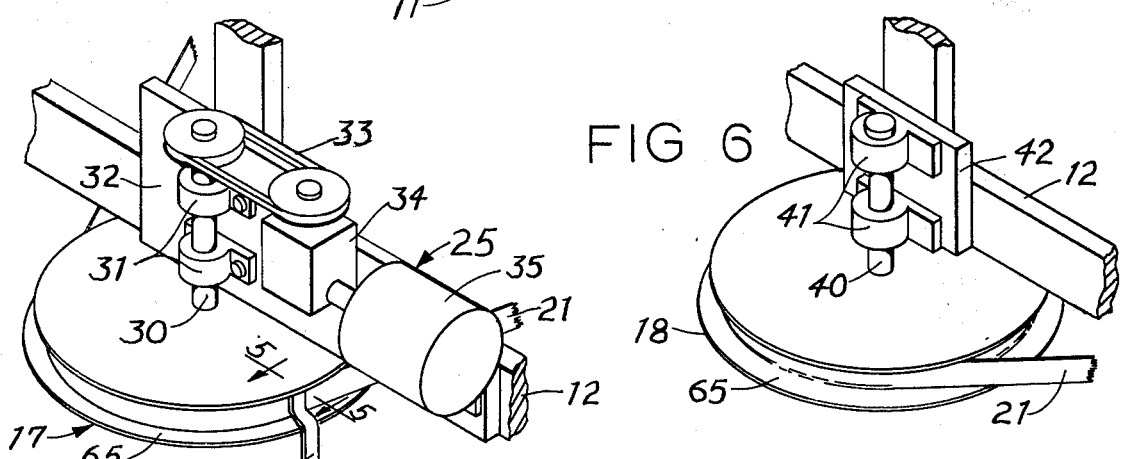
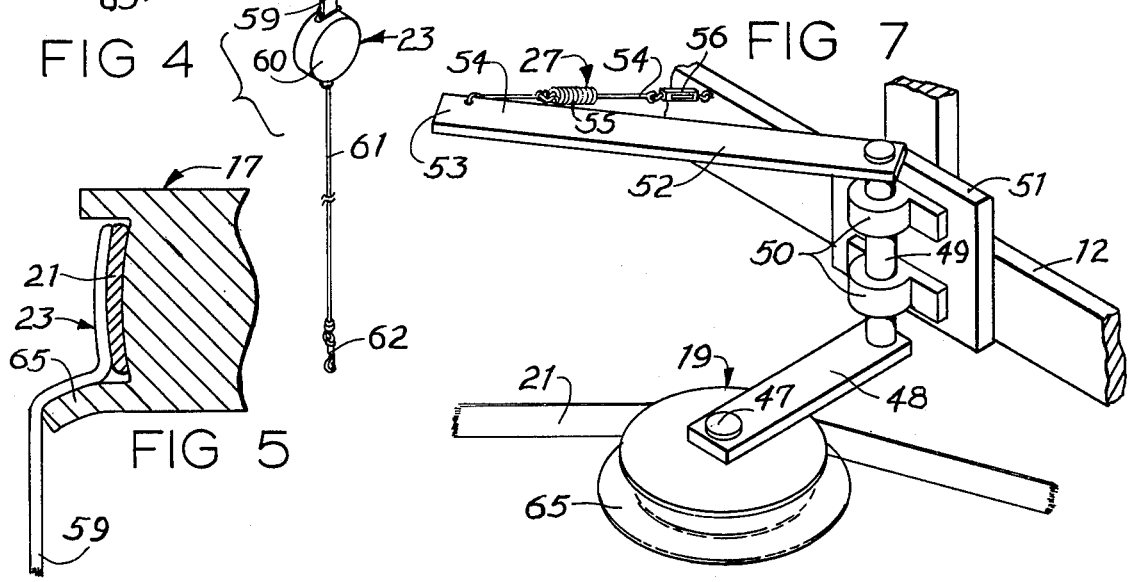

ANIMAL EXERCISER

BACKGROUND OF THE INVENTION

The present apparatus relates generally to the field of animal exercising apparatus and more particularly to such apparatus utilized for leading animals about a continuous circuit.

Exercise by walking or running has been proven to be very beneficial to an animal's condition and health. Often times this type of exercise is accomplished, in the case of horses, by riding or walking the horse over a desired period of time. This is a rather time consuming task, especially at stables, ranches or other areas where a large number of animals are kept. It is very desirable therefore to utilize some type of mechanical arrangement wherein the horses or other animals may be led automatically about a continuous circuit.

Animal exercising devices have been known and several United States Patents show such exercising devices utilized specifically for walking animals about a prescribed continuous circuit. U.S. Pat. No. 2,500,805 to E. Costello discloses an exercising device for horses wherein an exercising drive is shown mounted to upright supports. The apparatus is relatively complex in nature, utilizing a belt drive to move a cable about a specified circuit. The cable has mounted along its length a plurality of carriages that are movably supported on a continuous bar that extends about the periphery of the exerciser next to the cable. The bar is utilized to provide elevational support to the carriage. Tether lines depend from the carriages to be connected to an animal halter or collar.

Other animal exercising apparatus similar to the Costello device are almost all ground supported and therefore occupy a substantial amount of space and are not easily moved. An additional problem is that animals may stumble while tethered to a rigidly supported moving carriage and be seriously injured. Damage could also possibly be done to the exercising apparatus itself. A yet further problem is the danger of an animal tangling its legs in the tether. This may easily happen if the animal moves faster than the carriage. Again, this condition is hazardous both to the animal and to the exercising apparatus.

The present apparatus was designed to be mounted overhead within a building structure such as a barn or arena and utilizes a retractable tether that will maintain a constant upward tension on the tether regardless of differing speeds between the tether and animal. The belt utilized with the present apparatus is constructed of expansible nylon that will absorb shock produced when an animal stumbles and falls or rears against the completely extended tether. The extensible nature of the belt is taken up by a tensioning means specifically designed to apply an outward load on the belt to maintain it under constant tension as it moves about the circuit. Because a retractable tether is utilized, the area beneath the device, when it is not in use, is completely clear of obstacles and may be utilized freely for many other purposes.

SUMMARY OF THE INVENTION

An overhead animal exercising device is described that is adapted to be mounted to an overhead structure that spans a prescribed open area. An overhead structure such as ceiling joists may be utilized, having peripheral support such as outside walls. The apparatus includes a drive sheave, an end idler sheave, and a plurality of intermediate idler sheaves. The sheaves are all mounted for rotation about vertical axes. The drive sheave and end idler sheave are spaced apart with the intermediate idler sheaves interspersed between the axes of the drive and end idler sheaves. All the sheaves are adapted to be mounted to the overhead structure within the prescribed area. A flexible endless belt extends about the drive sheave, intermediate idler sheaves and end idler sheave to define a continuous circuit within the prescribed open area. A retractable tether means is fastened to the belt and depends therefrom for attachment to an animal. Drive means is further provided for rotating the drive sheave about its first axis and to thereby move the endless belt about the continuous circuit. Adjustable tensioning means is provided operatively associated with the intermediate idler sheaves to maintain the belt in a taut condition.

It is a first object of our invention to provide an animal exercising device that is mountable to an overhead support and having retractable tether assemblies whereby the complete device, when not in use, is located overhead to leave a free, open space below.

An additional object is to provide such device that includes inherent safety features that will neither harm an animal nor be damaged by an animal should the animal hesitate, fall, or balk at the tether.

An additional object is to provide such a device wherein a retractable tether is utilized to provide a continuous tension against the animal's halter or other fastening means in order to hold the tether in an upright condition and thereby prevent the animal's legs from becoming entangled in the tether cord.

It is a yet further object to provide such a device that is relatively simple in construction and may be easily installed in existing facilities.

A still further object is to provide such a device wherein the circuit defined by the belt and sheaves may be selectively varied to define an elongated course, a somewhat circular course, or whatever shape course is desired to accommodate various conditions dictated by structure design and environment.

These and further objects and advantages will become apparent upon reading the following disclosure which, taken with the accompanying drawings, describes a preferred form of our invention.

BRIEF DESCRIPTION OF THE DRAWINGS

FIG. 3 is a bottom view of the device shown mounted to the rafters of a building structure;

FIG. 4 is a detailed pictorial view of the drive mechanism utilized with the present invention;

FIG. 5 is a fragmentary section view taken along line 5—5 in FIG. 4;

FIG. 6 is a detailed pictorial view of the end idler sheave; and

FIG. 7 is a detailed pictorial view of one of the intermediate idler sheaves and its associated tensioning means.

DETAILED DESCRIPTION OF A PREFERRED EMBODIMENT

Figure 1:
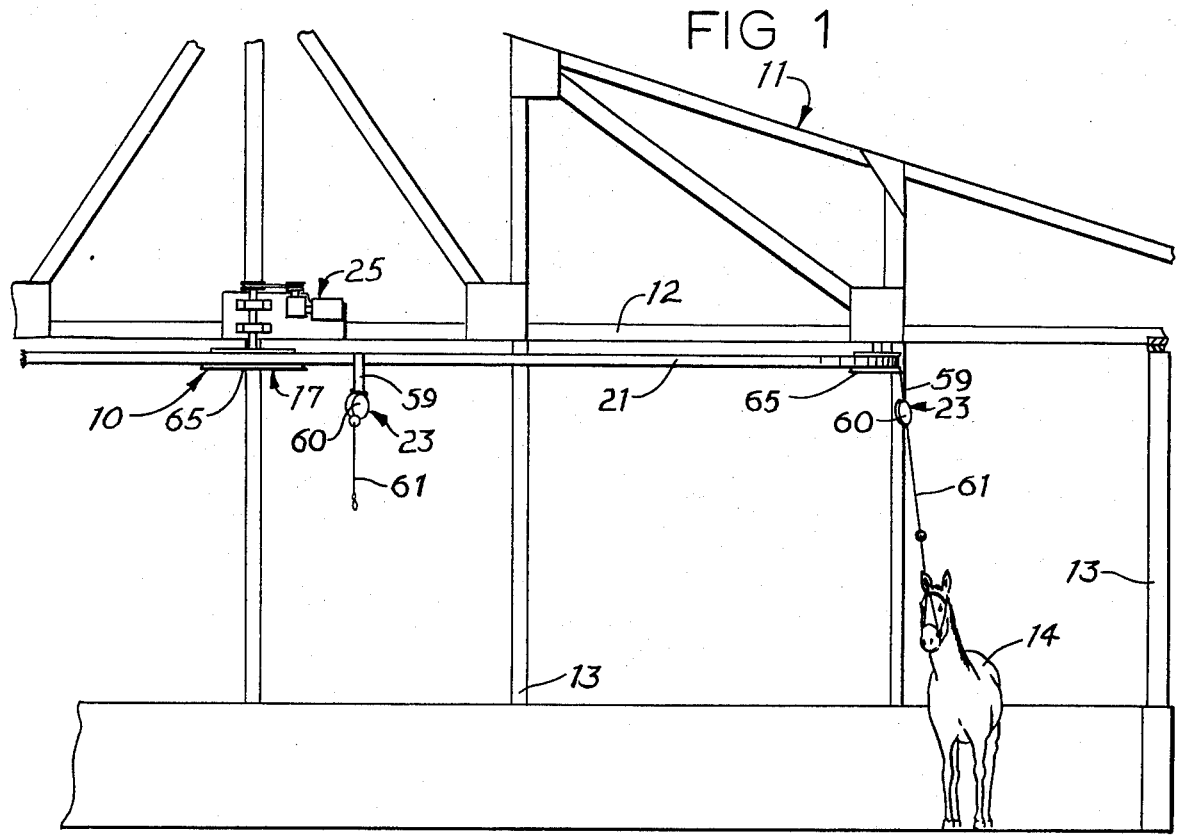
FIG. 1 is a fragmentary pictorial view of a portion of the apparatus shown being utilized to lead a horse about a circuit.

The device incorporated in the present invention is generally illustrated in the drawings and is assigned the reference character 10. The device 10 is adapted to be mounted within any appropriate building 11 having an overhead support structure such as joists 12. An open area below the joists is necessary, defined by peripheral supports such as outside walls 13. Normally such a building 11 may be a barn or an arena wherein animals are normally walked or otherwise exercised. Although preferred, it is not essential that the entire area below the device 10 be unobstructed. The only requirement is that an area immediately below the circuit defined by the device must be clear for the passage of the animals being exercised.

FIG. 3 generally illustrates the preferred configuration of the device when installed within a building structure 11. At one end of the structure is a drive sheave 17. Spaced from the drive sheave 17 and at the other end of the building is an end idler sheave 18. In between drive sheave 17 and end idler sheave 18 are positioned four intermediate idler sheaves 19. These sheaves 19 are aligned in pairs and spaced outwardly from the sheaves 17 and 18.

A continuous belt 21 is provided and engaged about the sheaves 17, 18 and 19 to define the circuit about which an animal 14 (FIGS. 1 and 2) will be led below. The belt 21 may include any number of spaced tether means 23 that are adapted for attachment to an animal such as a horse 14. A drive means 25 is provided to rotate the drive sheave 17 and in turn move the belt 21 and tether means 23 about the defined circuit. A tensioning means 27 is also provided, associated with each intermediate idler sheave 19 to maintain a constant tension on the belt 21 as it moves about the circuit.

Drive sheave 17 is illustrated in substantial detail in FIG. 4. As shown, the sheave 17 is mounted to a shaft 30 that extends upwardly through a vertically spaced pair of bearings 31. Bearings 31 are rigidly mounted to a mounting plate 32 and fastened to a building joist 12.

The remaining end of drive shaft 30 that extends above bearings 31 is connected to a drive linkage such as a chain and sprocket or pulley and belt arrangement 33 that transmits motion from a gearbox 34 to sheave 17. Gearbox 34 is operated by a drive motor 35. Motor 35 may be of a variable speed type to enable selective adjustment of the operational speed of the device. With such a provision, an animal can either be walked or run about the circuit.

The end idler sheave 18 is illustrated in some detail by FIG. 6. Sheave 18 is mounted to an upright shaft 40 that extends through a vertically spaced pair of bearings 41. Bearings 41 are rigidly mounted to a plate 42 that, in turn, is fastened to a joist 12. The end idler sheave 18, and drive sheave 17 are both mounted about vertical axes that are relatively stationary. Adjustment of the belt tension is accommodated through the four intermediate idler sheaves 19 that are movably mounted to joist 12.

FIG. 7 illustrates one such intermediate idler sheave in substantial detail. Sheaves 19 are each mounted by a stub axle 47 to a first crank arm 48 of tension adjusting means 27. Each crank arm 48 extends radially outward from a stub axle 47 to an end rigidly mounted to an upright shaft 49. These shafts 49, like shafts 30 and 40, are pivotably carried by vertically spaced pairs of bearings 50. The bearing pairs 50 are also mounted to plates 51 that are connected to appropriate joists 12. The upper end of each shaft 49 is each rigidly secured to one end of a second crank arm 52. Crank arms 52 extend outwardly from the shafts 49 to ends 53. It may be noted that the second crank arms 52 are considerably longer than the first crank arms 48 providing a lever action that assists tensioning means 27 to apply a considerable amount of tension to belt 21. Tensioning means 27 also includes a number of cords 54, springs 55, and turn buckles 56. These elements together constitute an adjustable spring assembly that enable the intermediate idler sheaves 19 to apply a selected tension on the belt 21 as it moves around the circuit.

Each cord 54 is connected to an arm end 53, to both ends of a spring 55, and to a turn buckle 56. Each turn buckle 56 is connected to a joist 12. Springs 55 are tension springs, the extension of which may be selectively adjusted by adjusting turn buckles 56. By adjusting turn buckles 56, the springs 55 are selectively tensioned and, through the lever action of arms 48 and 52, place the belt 21 under tension.

Figure 2:
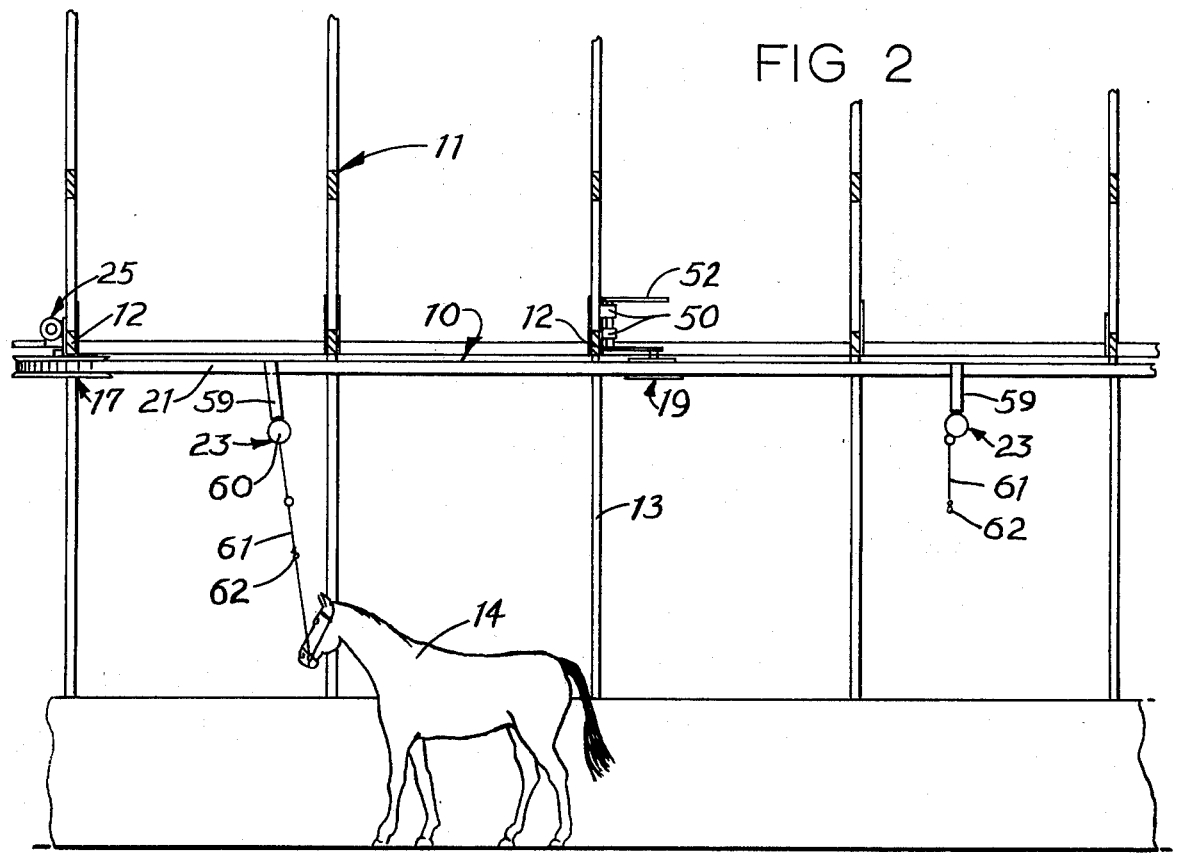
FIG. 2 is a side elevational view showing a similar arrangement as shown in FIG. 1 with the horse continuing about the circuit.

The tether means 23 is also illustrated in FIGS. 1, 2 and 4. Tether means 23 is comprised of straps 59 that are fastened to and depend from the belt 21. The lower ends of straps 59 each mount a spring loaded drum 60. A cord 61 is wound within the drum. The drum is designed to resist extension of the cord from the drum and will therefore continuously urge the cord toward the retracted condition as is shown in FIGS. 1 and 4. However, the cord 61 may be pulled from the drum 60 and fastened by means of a snap fastener 62 or other appropriate attachment to the animal's halter or other harness type arrangement. As seen in FIGS. 1 and 2, the drum 60 operates to maintain a continuous tension on cord 61 so that no slack is available to the animal regardless of its position relative to the belt 21. This is an important feature of the present apparatus in that it does not permit the animal to become entangled with the cord 61 either when rearing or running ahead of the drum 60.

The belt 21 is constructed of nylon or other expansible material that will stretch under excessive tension should a heavy animal such as a horse, trip and fall or otherwise balk against movement of belt 21 about the circuit. When such a condition exists, the expansible nature of the belt 21 takes up a substantial amount of the shock to the animal. Subsequently, either the belt will slip over the sheaves 17, 18 and 19, or the driving assembly will stall. In either situation no damage will be done to the animal or to the exercising device. Since the tensioning means holds the belt under continuous tension, any extension of the belt is automatically taken up.

Each sheave 17, 18 and 19 is supplied with an outwardly projecting annular flange 65 as shown in FIGS. 4, 6 and 7 and in detail in FIG. 5. The flange 65 is shown in FIG. 5 as being downwardly curved. This configuration is particularly adapted to accommodate the strap 59 as it moves about the circuit and engages each of the sheaves 17, 18 and 19. The flanges 65 prevent belt 21 from being pulled downwardly from engagement with sheaves 17, 18 and 19.

In operation, the trainer or exerciser may lead an animal(s) to the area immediately below each cord 61. He then pulls the cord end down and fastens it to the animal's halter utilizing snap fastener 62. The apparatus is then ready for use. The operator may then activate the drive motor 35 which commences to move the belt 21 and therefore leads the animal about the circuit defined by belt 21. The exercising may be continued over any desired length of time. When finished, the operator simply turns off the motor 35 and disconnects the animal from cord 61. Once released, the cord 61 returns to the retracted condition leaving the area below the device clear for other uses.

The above description and attached drawings were given by way of example and are not intended to restrict the scope of our invention. The invention is defined specifically in the following claims.

What we claim is:

1. An animal exercising device adapted to be mounted to an overhead structure spanning a prescribed open area and having peripheral support, such as ceiling joists and outside walls of a building structure, comprising:
    a drive sheave adapted to be mounted to the overhead structure within the prescribed open area for rotation about a first vertical axis;
    an end idler sheave adapted to be mounted to the overhead structure for rotation about a vertical axis spaced from the drive sheave;
    a plurality of intermediate idler sheaves also adapted to be mounted to the overhead structure within the prescribed open area for rotation about vertical axes spaced from one another and between the axes of said drive sheave and said end idler sheave;
    an extensible endless belt extending about said drive sheave, said end idler sheave and said intermediate idler sheaves to define a continuous circuit within the prescribed open area;
    tether means fastened directly to said belt and depending therefrom for attachment to an animal so that tension along the tether means may result in deflection of the belt;
    drive means for rotating said drive sheave about said first axis to thereby move said belt about said continuous circuit; and
    adjustable yieldable tensioning means operatively associated with said intermediate idler sheaves for maintaining said extensible belt in a taut condition.

2. The device as recited in claim 1 wherein said adjustable yieldable tensioning means comprises:
    a first crank arm rotatably mounted to and extending radially from each intermediate idler sheave;
    an upright shaft mounted at one end to an extended end of each first crank arm;
    bearing means for rotatably mounting each of said upright shafts to the overhead structure;
    second crank arms each greater in length than the first crank arms and mounted at one end to a respective upright shaft and extending outwardly therefrom; and
    an adjustable spring assembly extending from a remaining end of each second crank arm to the support structure to urge said first and second crank arms to pivot said intermediate idler sheaves outward from said circuit and thereby strain outwardly on said belt.

3. The device as recited in claim 1 wherein said tether means is retractable and is comprised of:
    at least one flexible strap fastened at an upper end to said belt and having a remaining end depending therefrom;
    a spring loaded drum mounted to said depending end of said strap;
    a length of cord wound about said drum having a free end depending therefrom;
    wherein said free cord end may be pulled downwardly against resistance from said drum and be connected to an animal, and when released said drum will automatically retract said cord to an elevated position.

4. The device as recited in claim 3 wherein said drive sheave, said end idler sheave, and said intermediate idler sheaves each have an annular bottom flange projecting outwardly therefrom to prevent said belt from being pulled downwardly from engagement thereby, and wherein said flanges are curved downwardly to permit free movement of said strap thereby.

* * * * *